United States Patent
Saitoh et al.

(10) Patent No.: US 7,746,735 B2
(45) Date of Patent: Jun. 29, 2010

(54) LASER FOCUS CONTROLLING METHOD ON AN OPTICAL DISK AND AN OPTICAL DISK APPARATUS WITH USING THEREOF

(75) Inventors: Toshio Saitoh, Matsudo (JP); Toshio Shoji, Urayasu (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 809 days.

(21) Appl. No.: 11/542,273

(22) Filed: Oct. 4, 2006

(65) Prior Publication Data

US 2007/0274173 A1 Nov. 29, 2007

(30) Foreign Application Priority Data

May 29, 2006 (JP) .............................. 2006-148044

(51) Int. Cl.
*G11B 7/00* (2006.01)
(52) U.S. Cl. ................................. 369/44.35; 369/44.34
(58) Field of Classification Search .............. 369/44.35, 369/44.29
See application file for complete search history.

(56) References Cited

U.S. PATENT DOCUMENTS 6,195,319 B1 * 2/2001 Ohshita et al. ........... 369/44.35

FOREIGN PATENT DOCUMENTS

JP 2002-367193 12/2002
JP 2005-174383 6/2005

OTHER PUBLICATIONS

JP 2005-174383 Method of eliminating stray light offset and optical disk apparatus Sakata Shingo Jun. 2005 (english translation).*

* cited by examiner

*Primary Examiner*—Van N Chow
(74) *Attorney, Agent, or Firm*—Antonelli, Terry, Stout & Kraus, LLP.

(57) ABSTRACT

In a focus controlling method of a laser beam for an optical disk, achieving a stable focus drawing-in, lowering ill influences due to stray lights, detecting an electric signal, which is obtainable upon basis of a reflection light from the optical disk loaded, in advance, while executing a focus sweep operation of gradually approaching the laser to a recoding surface of the optical disk, at an unnecessary light detection gain being higher than a gain of normal operation, thereby counting a number of signals generated due to unnecessary lights; and thereafter, detecting the electric signal, which is obtainable upon basis of the reflection light from the optical disk loaded, and thereby conducting a focus drawing-in, by considering an electric signal, which is generated just after a number detected thereof reaches to the counted number of signals generated due to the unnecessary lights, to be a signal reflected from the recording surface of the optical disk loaded.

12 Claims, 5 Drawing Sheets

LASER BEAM
(WAVELENGTH 405 nm)

LASER FOCUS CONTROLLING METHOD ON AN OPTICAL DISK AND AN OPTICAL DISK APPARATUS WITH USING THEREOF

BACKGROUND OF THE INVENTION

The present invention relates to a focus controlling method of a laser beam within an optical disk apparatus for recording/reproducing the optical disk, and in particular, relates to the focus controlling technology of a laser beam for an optical disk, for achieving a stable focus drawing-in with reducing ill influences due to a stray light.

An optical disk apparatus is widely used for enabling an access to a large amount of data at high speed, using an optical disk, i.e., a large-capacitive and low-cost optical information recording medium, but without contact thereon within a personal computer, for example. However, in such an optical disk apparatus, a reflection light entering into an inside of an optical pickup, which is generated when a focus point of the laser beam is coincident with the optical disk surface, comes to be stray lights after being scattered therein, and due to such the stray lights is generated an alias or false signal, other than a focus signal generated due to reflection upon a recording surface of the optical disk.

In recent years, the optical disk apparatus becomes more compact. As such, Work Distance (WD) of the optical pickup comes to be narrow, and further a next-generation DVD (so-called Blu Disc (BD (®)) is put into a practical use thereof, which is very narrow in this WD. Accompanying with this, the optical disk surface and a focus lens come close to each other, and for that reason, the ill influences of the stray lights as mentioned above become more pronounced and cannot be ignored.

Herein, as the conventional art for removing the ill influences of the imitation signal due to the stray lights, Japanese Patent Laid Open No. 2002-367193 discloses therein a control in which a position of generating the false signals due to the stray lights is memorized in advance duing manufacturing, and an operation of focus drawing-in will not be started within a time during when the false signals are generated.

In addition, Jananese Patent Laid Open No. 2005-174383 discloses a control of calculating out focus drive signal voltage at a position receiving no ill influence due to the surface reflection on the optical disk, upon basis of the focus drive signal voltage when detecting out so-called S-like signal, so as to move the optical pickup to that position, thereby removing an offset due to the stray lights.

However, with such the conventional arts as was mentioned above, there are still remaining the following drawbacks:

Thus, within the optical disk reproducing apparatus disclosed by JP 2002-367193, since a time for generating the false signals depends on an mount of surface deflection of the disk, it is impossible to determine uniformly. In addition thereto, in particular, with the BD disk being very narrow (for example, in a degree of 0.1 mm), in the distance between the disk surface and the recording surface thereof, as was mentioned above, the time for masking the said false signals also comes to be very narrow, and the control itself is difficult to conduct.

Also, with the later JP 2005-174383, however, in the similar manner to the above, it is difficult to apply it into a high-speed drive, which can be easily affected with the ill influences due to the surface deflection, and in particular, into a BD disk drive.

On the other hand, further for avoiding such the ill influences upon the S-like signal due to the stray lights, a method of achieving the focus drawing-in is provided while directing the focus point from a reverse side of the optical disk to a surface side thereof, for example. With such method, however, within the BD disk drive being very narrow in the WD of the optical pickup, accompanying with thin-sizing of the optical disk apparatus, there is still a possibility that the optical pickup collides on the optical disk, thereby causing damage thereupon.

BRIEF SUMMARY OF THE INVENTION

The present invention drawbacks of the conventional arts mentioned above. An object thereof is to provide a focus controlling method of a laser beam, for removing the ill influences of the stray lights, which are caused due to reflection on the optical disk surface, upon the S-like signal, and further enabling to deal with the optical disk, which is narrow in the distance between the disk surface and the recording surface thereof, but without being affected with the ill influences due to the surface deflection, and also an optical disk apparatus with using thereof.

Further, the present invention is achieved upon basis of a finding made by the inventors of the present invention, that the number of the false signals appearing between the top surface and the recording surface of the optical disk, which are caused due to the stray lights mentioned above, is unique to the optical pickup, irrespective of a kind or sort of the optical disk, and further by paying an attention to behavior of a lens error signal when conducting a focus sweep operation under the condition of shifting a lens.

Thus, for accomplishing the object mentioned above, according to the present invention, first of all, there is provided a laser focus controlling method on an optical disk, for controlling a focus position of a laser beam by irradiating said laser beam upon the optical disk and obtaining a reflection light obtainable therefrom, comprising the following steps: a preprocess for detecting an electric signal, which is obtainable upon basis of a reflection light from the optical disk loaded, in advance, while executing a focus sweep operation of gradually approaching the laser to a recoding surface of the optical disk, at an unnecessary light detection gain being higher than a gain of normal operation, thereby counting a number of signals generated due to unnecessary lights; and a process for detecting the electric signal, which is obtainable upon basis of the reflection light from the optical disk loaded, and thereby conducting a focus drawing-in, by considering an electric signal, which is generated just after a number detected thereof reaches to said counted number of signals generated due to the unnecessary lights, to be a signal reflected from the recording surface of the optical disk loaded.

Further, according to the present invention, within the laser focus controlling method as described in the above, preferably, said preprocess is conducted while stopping rotation of the optical disk loaded, or measurement is made on a number of signals, by considering a focus error signal to be said the signal obtainable, and considering the signals appearing until just before when reaching to maximum amplitude thereof to be the signals, which are generated due to said unnecessary lights, in the preprocess. Further, it is preferable that, the number of signals generated due to the unnecessary lights, which is counted in the preprocess, is memorized, to be used in the focus drawing-in process thereafter.

Further, according to the present invention, also for accomplishing the object mentioned above, there is provided a laser focus controlling method on an optical disk, for controlling a focus position of a laser beam by irradiating said laser beam upon the optical disk and obtaining a reflection light obtainable therefrom, comprising the following steps: executing a focus sweep operation, upon the optical disk loaded, into a direction for gradually approaching to a recording surface of the optical disk, under a condition of shifting a lens for focusing the laser beam into a tracking direction; detecting said focus sweep operation, and at same time a signal for detecting the condition that the lens is shifted into the tracking direction; and executing a focus drawing-in, with using the signal obtained in said focus sweep operation, by applying a rise-up of said detected signal of shifting condition of the lens to be a timing of generation of the signal from the recording surface of said optical disk loaded.

Further, according to the present invention, within the laser focus controlling method as described in the above, it is preferable that said detected signal of shifting condition of the lens is digitized, so as to apply the rise-up thereof to be the timing of generation of the signal from the recording surface of said optical disk loaded. Further, there is also provided a laser focus controlling method on an optical disk, comprising the following steps: counting a number of signals, which are generated due to unnecessary lights, by applying the method as described in the above; and further a process for detecting the electric signal, which is obtainable upon basis of the reflection light from the optical disk loaded, and thereby conducting a focus drawing-in, by applying an electric signal, which is generated just after a number detected thereof reaches to said counted number of signals generated due to the unnecessary lights, to be a signal reflected from the recording surface of the optical disk loaded.

Also, according to the present invention, for achieving the object mentioned above, too, there is provided an optical disk apparatus, comprising: a pickup including at least a light radiation source of a laser beam and an objective lens; a spindle motor for loading and rotationally driving an optical disk thereon; a generator for generating an electric signal obtainable upon basis of a reflection light from said optical disk loaded; a portion for executing a focus sweep operation of gradually approaching the laser beam to a recording surface of said optical disk; and a controller for controlling said apparatus, as well as, having a memory, wherein said controller detects an electric signal, which is obtainable upon basis of a reflection light from the optical disk loaded, in advance, while executing a focus sweep operation of gradually approaching the laser to a recoding surface of the optical disk, at an unnecessary light detection gain being higher than a gain of normal operation, thereby counting a number of signals generated due to unnecessary lights, to be memorized within said memory, and thereafter detecting the electric signal, which is obtainable upon basis of the reflection light from the optical disk loaded, and thereby conducting a focus drawing-in, by applying an electric signal, which is generated just after a number detected thereof reaches to said counted number of signals generated due to the unnecessary lights, to be a signal reflected from the recording surface of the optical disk loaded.

Also, according to the present invention, for achieving the object mentioned above, too, there is further provided an optical disk apparatus, comprising: a pickup including at least a light radiation source of a laser beam and an objective lens; a spindle motor for loading and rotationally driving an optical disk thereon; a generator for generating an electric signal obtainable upon basis of a reflection light from said optical disk loaded; a portion for executing a focus sweep operation of gradually approaching the laser beam to a recording surface of said optical disk; and a controller for controlling said apparatus, as well as, having a memory, wherein said controller detects said focus sweep operation, and at same time a signal for detecting the condition that the lens is shifted into the tracking direction, and executes a focus drawing-in, with using the signal obtained in said focus sweep operation, by applying a rise-up of said detected signal of shifting condition of the lens to be a timing of generation of the signal from the recording surface of said optical disk loaded.

And, according to the present invention, for achieving the object mentioned above, too, there is further provided an optical disk apparatus, comprising: a pickup including at least a light radiation source of a laser beam and an objective lens; a spindle motor for loading and rotationally driving an optical disk thereon; a generator for generating an electric signal obtainable upon basis of a reflection light from said optical disk loaded; a portion for executing a focus sweep operation of gradually approaching the laser beam to a recording surface of said optical disk; and a controller for controlling said apparatus, as well as, having a memory, wherein said controller detects said focus sweep operation, and at same time a signal for detecting the condition that the lens is shifted into the tracking direction, in advance, thereby counting a number of signals generated due to unnecessary lights, considering a rise-up of said detected signal of shifting condition of the lens to be a timing of generation of the signal from the recording surface of said optical disk loaded, and further detects an electric signal obtainable upon basis of the reflection light from the optical disk loaded, thereby conducting a focus drawing-in, by considering an electric signal, which is generated just after a number detected thereof reaches to said counted number of signals generated due to the unnecessary lights, to be a signal reflected from the recording surface of the optical disk loaded.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
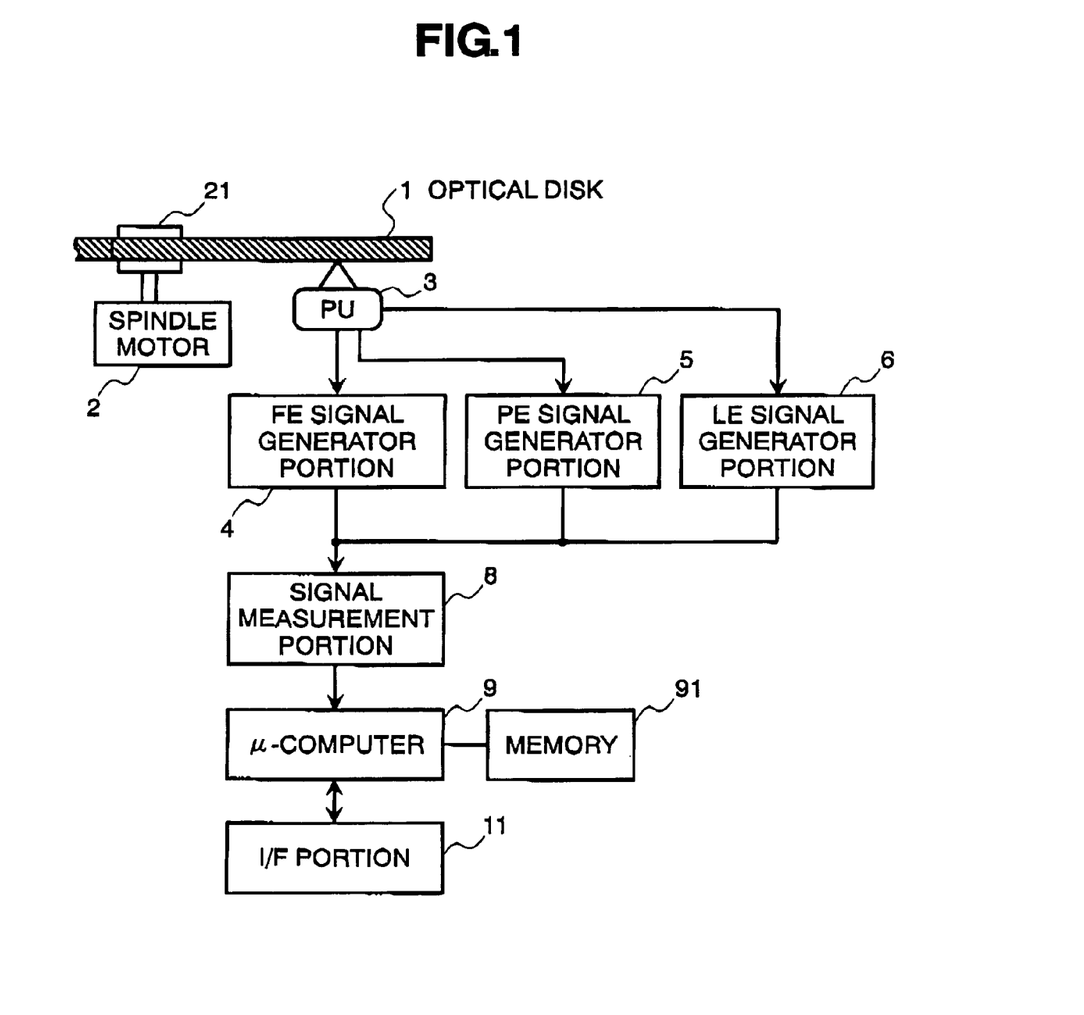
FIG. 1 is a block diagram for showing the entire structures of an optical disk apparatus, according to an embodiment of the present invention.

First of all, FIG. 1 is a view for showing outline structures of the optical disk, according to an embodiment of the present invention, and it is a block diagram for mainly showing the constituent elements for achieving a focus controlling method of a laser beam, according to the present invention.

Firstly, FIG. 1 shows the entire structures of the optical disk apparatus, according to one embodiment of the present invention. In the figure, an apparatus comprises a spindle motor 2, wherein an optical disk 1, one of various kinds of optical disks, on which recording/reproducing is conducted by the said apparatus, is loaded on a turntable 21, which is attached onto a tip of an output shaft of the spindle motor, thereby being rotationally driven at a predetermined speed. On the other hand, though the detailed structures thereof will be mentioned later, a pickup 3 irradiates a laser beam of a predetermined strength or intensity onto the optical disk 1 loaded, while detecting a reflection light from that optical disk 1, so as to convert it into an electric signal. Upon basis of the detection signal from this pickup 3, a FE signal generator portion 4 generates a focus error signal, and a PE signal generator portion 5 generates a sum signal, respectively. Also, a reference numeral 6 in the figure depicts a LE signal generator portion for generating a lens error signal (hereinafter, called by "LE"), as a signal for detecting the condition that a lens is shifted into a tracking direction.

Further, a signal measurement portion 8, measuring levels of those various signals, outputs them to a microcomputer (hereinafter, called by a "μ-computer") 9. This μ-computer 9 compares a level value of the detection signal supplied from the signal measurement portion 8 with a threshold value, which is memorized in advance within a memory 91, i.e., a memory device thereof, and thereby conducting determination upon a kind of the optical disk loaded, as will be explained below in more details thereof, and also recording/reproducing information onto/from an information recording surface of the optical disk loaded, in accordance with a already-known method. Also, an I/F (Interface) portion 11 in the figure transmits operation content inputted by a user to the μ-computer 9, and it also outputs the information from the μ-computer 9 to a display portion.

Figure 2:
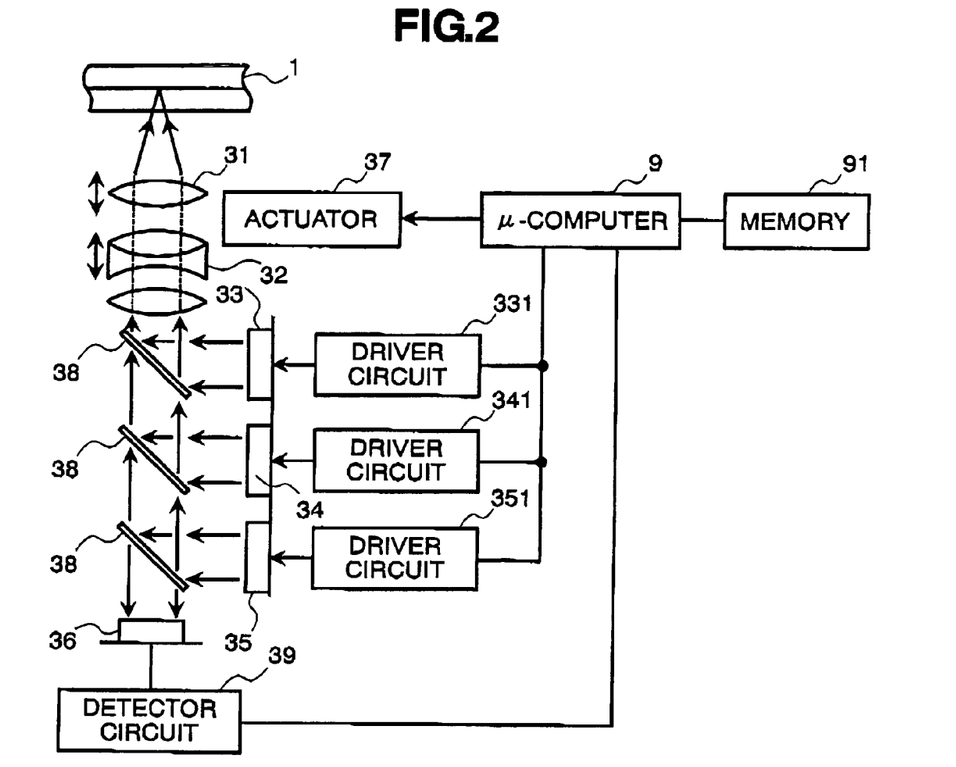
FIG. 2 is a view for showing the detailed structures, in particular, within an inside of an optical pickup, in the optical disk apparatus mentioned above.

FIG. 2 attached herewith a view for showing the detailed structures, in particular, within an inside of the pickup 3 mentioned above, in the optical disk apparatus, the entire structures of which was shown in the above. In this figure, the pickup 3 is disposed facing to a top surface (i.e., a lower surface in the figure) of the optical disk 1, and it comprises an optic system, including an objective lens 31 and a beam expander 32, etc., laser beam generation elements 33, 34 and 35, being made of laser diodes, for example, each generating a laser beam, respectively, being different in wavelength from one another, and further a light receiving element 36, which may be built up with a photodiode or the like, for example. Further, this objective lens 31 is made of a three-wavelengths compatible objective lens, and is movable into a direction perpendicular to the surface of the optical disk 1 (see an arrow in the figure), together with the beam expander 32 constructed with plural numbers of lenses, by means of an actuator 37 by applying an electromagnetic force therein, for example.

Also, radiations of the laser beam generation elements 33, 34 and 35 are driven through respective driver circuits 331, 341 and 351, responding to instructions from the μ-computer 9 mentioned above; for example, the element 33 radiates a laser beam of wavelength 405 nm for use of BD, the element 34 radiates a laser beam of wavelength 650 nm for use of DVD, and the element 35 radiates a laser beam of wavelength 780 nm for use of CD, respectively. Also, a reference numeral 38 in the figure depicts so-called a half mirror (or, may be a polarization beam splitter), for reflecting the laser beam radiated from each of the laser beam generation elements 33-35, so as to irradiate it upon the surface of the optical disk 1 through the objective lens 31 and the beam expander 32, and also for passing through the reflection light from the surface of that optical disk 1, so as to guide it onto the light receiving element 36. Further, the reflection light received by the light receiving element 36 is detected within a detector circuit 39, thereby being converted into an electric signal.

Following to the above, explanation will be made on the focus controlling method of a laser beam, which is executed within the optical disk apparatus, the inner structures of the pickup thereof were shown in the above, but before that, explanation will be made on the principle thereof.

Figure 3:
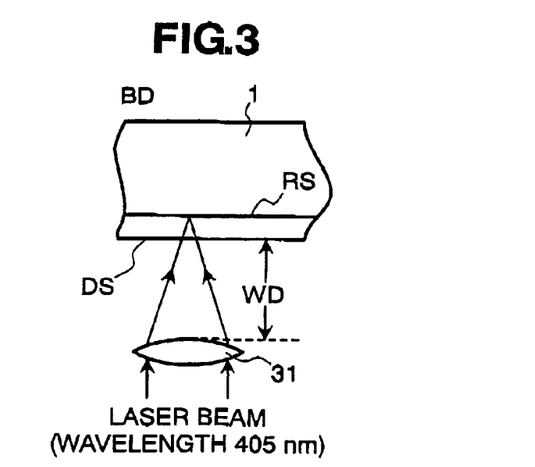
FIG. 3 is a view for explaining a Work Distance (WD) defined between the disk surface (DS) and a recording surface (RS) within the optical disk apparatus, being operable with an optical disk, in particular, BD.

In general, when starting the focus control of a laser beam, it is necessary to detect a focus signal, with certainty, from the reflection lights reflected upon the recording surface of the optical disk. However, in actual, because of the aliases or false signals due to reflection upon the disk surface and/or unnecessary lights, as was mentioned in the above, it is necessary to avoid the false signals due to those unnecessary lights, or remove them, for fitting the focus onto the recording surface. Also, in addition to the above, in particular, within the optical disk apparatus being compatible with three (3) wavelengths for BD, DVD and CD, as is shown in FIG. 3 attached herewith, since the distance between the disk surface (DS) and the recording surface (RS) is very narrow (for example, in a degree of 0.1 mm), then WD comes to be very small from a top surface of the objective lens 31 to the recording surface (RS), and therefore it is needed to execute a focus sweep operation, necessarily, directing from a lower side (i.e., the side far from the disk) into an upper direction. Accordingly, even if the optical disk apparatus has an optic system generating no such unnecessary light therein, but it is necessarily affected with the ill influences due to reflection upon the disk surface. For that reason, there is a necessity of avoiding that reflection lights, and a method for avoiding the unnecessary lights will be mentioned, hereinafter.

Figure 4:
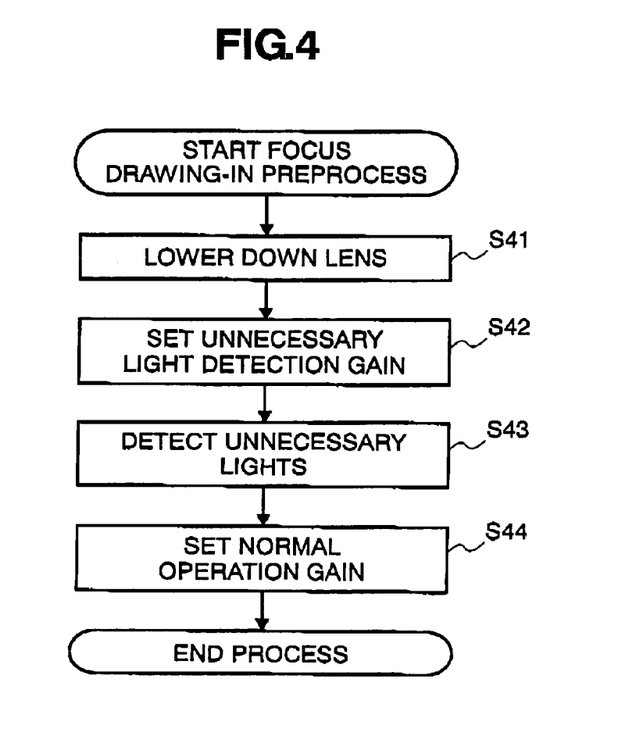
FIG. 4 is a flowchart for explaining the contents of a focus drawing-in preprocess, which is executed within the optical disk apparatus mentioned above.

First of all, it is necessary to detect a number of the unnecessary lights generated from the optical disk loaded into the apparatus. As a process for that purpose is executed the process, which is shown in FIG. 4 attached herewith, i.e., a "focus drawing-in preprocess". This process is executed, automatically, when the product is shipped out from a factory, or an optical disk is loaded into that apparatus, for example. And, also this process is executed under the condition that the optical disk loaded is stopped in rotation thereof.

In this "focus drawing-in preprocess", as is shown in FIG. 4, when the process is started, the lens within the pickup is lowered down (step S41), and thereafter, a gain is set to "unnecessary light detection gain" (step S42). Thus, this is for the purpose of detecting the unnecessary lights, with certainty, by increasing the gain. Thereafter, the focus sweep operation is conducted (i.e., in such a direction that it comes close to, or approaches the recording surface of the optical disk, sequentially or gradually) by means of the laser beam, while elevating the lens gradually, and detection is made on the number of the unnecessary lights, which appear during that period (step S43). Thereafter, the gain is reset to a normal operation gain, again (step S44), and thereby completing a series of processes.

Figure 5:
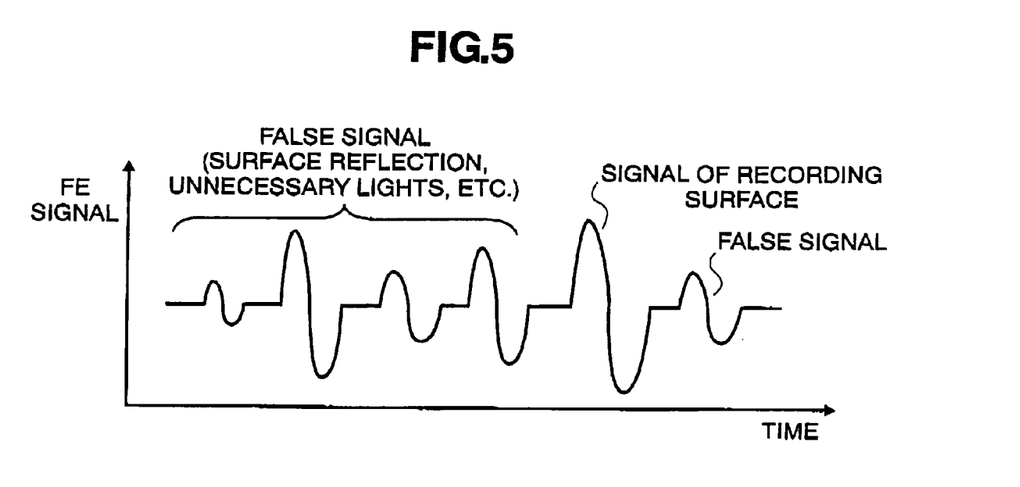
FIG. 5 is a signal waveform view for showing a condition of a FE signal, which can be obtained through the focus drawing-in preprocess mentioned above.

In accordance with "focus drawing-in preprocess" mentioned above, for example, as is shown in FIG. 5 attached herewith, the number of the unnecessary lights generated during the time-period, from when starting the focus sweep up to when focus of the laser beam reaches onto the recording surface, is constant irrespective of the disks. However, amplitude thereof (i.e., an amplitude of the signal, which is outputted from the detector circuit 39, being converted from the reflection light upon the light receiving element 36 in FIG. 2) differs from, depending on combinations of the apparatus and the disks. Thus, in general, the unnecessary light is smaller in the amplitude thereof, than the signal upon the recording surface; therefore, among the signals obtained by conducting the focus sweep thereon, it can be determined that the signal having the largest amplitude is the signal upon the recording surface (i.e., a regular S-like signal), and others are generated due to the unnecessary lights. Because of this, it is possible to identify or determine the number of pieces of the unnecessary lights, which appear up to the time when the signal upon the recording surface appears when conducting the focus sweep. Thus, measurement is made on the number of pieces of the signals, which appear when conducting the focus sweep operation; among of those, one having the largest amplitude is the signal upon the recording surface, and the number of pieces of the signals appearing before that is the number of piece of the unnecessary lights.

And, it is also possible to achieve the above, by measuring the focus error signal (hereinafter, called by "FE") or a lump sum signal of reflection lights (hereinafter, called by "PE"), as the signals which are detected in the "focus drawing-in preprocess" mentioned above. Also, in that Instance, it is preferable that the pickup is provided with a protector for protecting from collision thereof, so that the pickup gives no damage thereupon when it hits on the optical disk. Further, with a speed of focus sweep mentioned above, it is possible to almost neglect the damage, which the optical pickup gives on the optical disk when hitting, by lowering it down a low speed.

And, the number of pieces of the unnecessary lights, which are detected in the step S43 mentioned above, are stored within the memory 91, i.e., the memory device of the µ-computer 9 mentioned above, for example. Thus, it is possible to achieve the focus drawing-in under the condition of removing the ill influences due to the unnecessary lights therefrom, by executing the focus drawing-in with applying the number of pieces of the unnecessary lights, which are detected in the method mentioned above, to be "number of unnecessary lights" within "focus drawing-in process", which will be mentioned hereinafter.

Next, explanation will be made in details of the "focus drawing-in process" within the optical disk apparatus mentioned above, by referring to FIG. 6 attached herewith. However, this process is provided for obtaining the focus, with certainty, upon the recording surface of the optical disk, which is rotationally driven by the spindle motor, after detecting the number of pieces of the unnecessary lights generated in the above.

Figure 6:
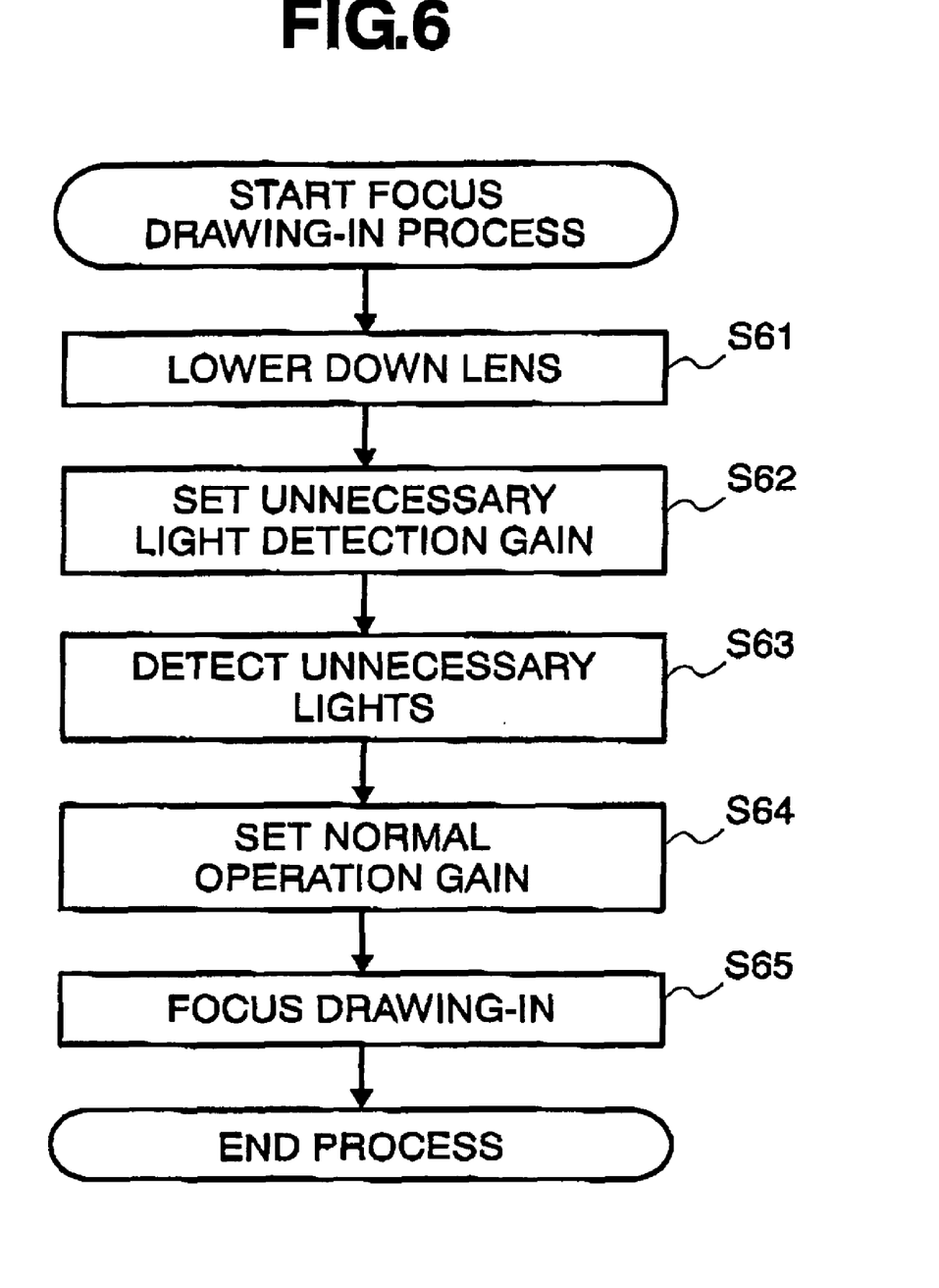
FIG. 6 is a flowchart for explaining the contents of a focus drawing-in process, which is executed within the optical disk apparatus mentioned above.

Firstly, as is shown in FIG. 6, in this "focus drawing-in process", when the process is started, the lens within the pickup is lowered down (step S61), and thereafter, in the similar manner as was mentioned above, the gain is set to "unnecessary light detection gain" (step S62). With doing this, it is possible to detect the necessary signal reflecting from the recording surface (i.e., S-like curve of the FE signal, in the example shown in the figure), but excluding the unnecessary lights, with certainty, even when conducting a normal focus drawing-in. Thereafter, while conducting the focus sweep operation by the laser beam, with elevating the lens, gradually, detection is made on a number of the unnecessary lights appearing in the form of the FE signal or the PE signal during thereof (step S63), however herein, detection is made only up to the "unnecessary light number" determined in the "focus drawing-in preprocess" mentioned above, in more details, the number of pieces, which is stored within the memory 91, being the memory device of the µ-computer 9 mentioned above.

And, after detecting the FE signal or the PE signal up to the "unnecessary light number", the gain is reset to the normal operation gain, again (step S64), and thereafter, the focus drawing-in (step S65) for focusing the laser beam upon the recording surface is executed, thereby completing a series of processes thereof.

In this manner, according to the present invention, detection is made upon the unnecessary lights with increasing the gain of the signal output, for the purpose of amplifying the unnecessary lights up to certainly detectable amplitude, upon basis of the new acknowledgement that the number of the unnecessary lights generated during the time-period, from the time when staring the sweep up to the time when the focus of the laser beam reaches to the recording surface, is constant irrespective of the disks. However, the focus error (FE) signal or the lump sum (PE) signal of reflection lights, etc., may be applied to the signal to be detected in this instance. And, after measuring the number of pieces of the unnecessary lights generated and counting them only up to the necessary number, which is obtained in advance in the preprocess (see the flowchart shown in FIG. 4 mentioned above), setup of the gain for the normal operation is made. As a result thereof, the signal appearing thereafter should be the signal upon the recording surface; therefore, it is enough to achieve the focus drawing-in through conducting the normal operation, with using this signal. However, in this instance, for the purpose of removing the ill influences due to the surface deflection of the optical disk when detecting the unnecessary lights, it is preferable to set up the rotation speed of the optical disk delayed, and at the same time, to make the sweep speed fast, for example.

However, in the embodiment mentioned above, although the unnecessary lights can be deleted or removed by setting up the number of signals generated due to the unnecessary lights ("unnecessary light number"), which appear until appearance of the signal upon the recording surface (i.e., the regular S-like signal), by detecting them in advance through conducting the preprocess upon the focus error (FE) signal or the lump sum (PE) signal of reflection lights, etc., thereby enabling to detect only the necessary signal reflected upon the recording surface, with certainty; however, further hereinafter, explanation will be given about other embodiment for detecting a focus drawing-in timing with using the lens error signal, in the place of that mentioned above, by referring to FIGS. 7 and 8 attached herewith.

Figure 7:
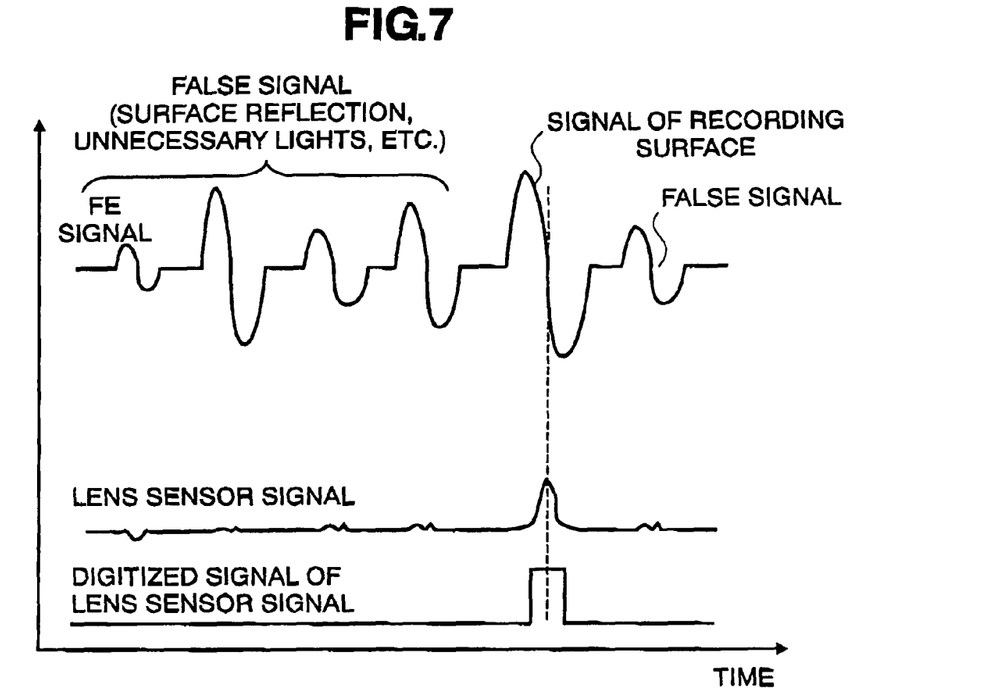
FIG. 7 is a signal waveform view for showing the conditions of various kinds of signals, including a signal from the pickup therein, for explaining other embodiment of the present invention.

As was shown in FIG. 1 mentioned above, for the signal from the pickup is generated so-called the lens error signal (hereinafter, being called by "LE"), as the signal for detecting the condition that the objective lens 31 is shifted into the tracking direction. As is shown in FIG. 7, this LE signal appears largely in the vicinity of the focus (i.e., in the vicinity of the recording surface RS of the optical disk). Then, in accordance with this other embodiment, detection is made upon the timing for the focus drawing-in, with using that fact.

Figure 8:
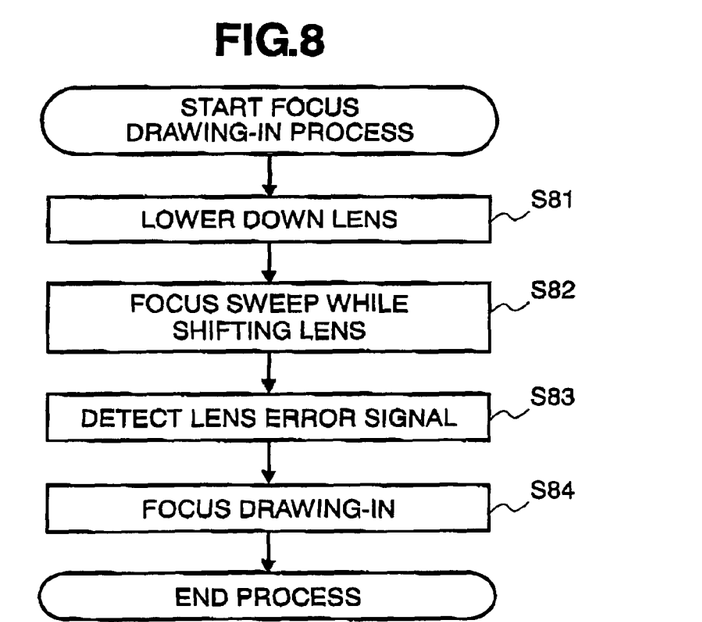
FIG. 8 is a flowchart for explaining the contents of focus drawing-in process, according to the other embodiment of the present invention.

Thus, with this method, as is shown in FIG. 8, when staring the focus drawing-in process, then the position of the objective lens in the pickup is lowered down (step S81), and thereafter the focus sweep is started under the condition of shifting that objective lens (step S82). And, detection is made on the signal from the recording surface of the optical disk, by detecting the LE signal mentioned above (step S83). However, in more details thereof, this LE signal is digitized, so as to detect the rise-up of that digitized LE signal. Thus, at the timing when detecting the rise-up of the digitized LE signal, since the focus position of the laser beam is located in the vicinity of the recording surface (RS) of the optical disk, it is also possible to execute the focus drawing-in operation under the condition of removing the ill influences due to the unnecessary lights, in the similar manner, by starting the focus drawing-in operation at this timing.

However, in the other embodiment mentioned above, the explanation was made that the optical disk apparatus starts the focus drawing-in operation, through executing the focus sweep from the surface side of the optical disk under the condition of shifting the lens, in the focus drawing-in, and thereby considering the timing when detecting the rise-up of the lens error signal or the lens sensor signal to be the recording surface. However, according to the present invention, it should not be limited only to this, but also, in the similar manner to that shown in FIG. 6, the optical disk apparatus may start the focus drawing-in operation, by setting up the number of signals generated due to the unnecessary lights ("unnecessary light number"), which appear until appearance of the signal upon the recording surface (i.e., the regular S-like signal), in advance, adopting the other method to be the preprocess, for example.

As was fully mentioned in the above, with the laser focus controlling method on the optical disk and the optical disk apparatus according to the present invention, there can be obtained superior effects of removing the ill influences due to the stray lights upon reflection upon the optical disk surface, and further enabling to deal with an optical disk having a narrow distance between the disk surface and the recording surface thereof, but without being affected with ill influences due to the surface deflection.

The present invention may be embodied in other specific forms but without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A laser focus controlling method for controlling a focus position of a laser beam on an optical disk in an optical disk apparatus by irradiating said laser beam upon the optical disk and obtaining a reflection light therefrom, the method comprising:

performing a pre-process for detecting an electric signal, which is obtainable upon basis of reflection lights reflected from the optical disk loaded in the optical disk apparatus, including unnecessary lights detected at a disk surface and between said disk surface and a recording surface from the optical disk, while executing a focus sweep operation of gradually approaching the laser beam to a recording surface of the optical disk, at an unnecessary light detection gain set higher than a normal operation gain, thereby counting a number of signals generated due to the unnecessary lights; and performing a focus drawn-in process for detecting the electric signal, which is obtainable upon basis of the reflection lights reflected from the optical disk loaded in the optical disk apparatus, and conducting a focus drawing-in, by considering an electric signal, which is generated after a number of signals detected thereof reaches to a counted number of signals generated due to the unnecessary lights, to be a necessary signal reflected from the recording surface of the optical disk.

2. The laser focus controlling method as claimed in claim 1, wherein said pre-process is performed while stopping rotation of the optical disk loaded in the optical disk apparatus.

3. The laser focus controlling method as claimed in claim 1, wherein measurement is made on a number of signals, by considering a focus error (FE) signal to be the electric signal, and considering the signals having an amplitude smaller than a maximum amplitude thereof to be the signals generated due to the unnecessary lights, during the pre-process.

4. The laser focus controlling method as claimed in claim 1, wherein the number of signals generated due to the unnecessary lights, which is counted during the pre-process, is memorized, to be used in the focus drawing-in process as the counted number of signals due to the unnecessary lights.

5. An optical disk apparatus, comprising: a pickup including a light radiation source to irradiate a laser beam and an objective lens;

a spindle motor for loading and rotationally driving an optical disk mounted thereon;

a generator for generating an electric signal obtainable upon basis of reflection lights reflected from said optical disk;

a controller for executing a focus sweep operation of gradually approaching the laser beam to a recording surface of said optical disk, and for controlling a focus position of the laser beam on the optical disk to reduce ill influences due to unnecessary lights, wherein said controller performs a pre-process when the optical disk is mounted on the spindle motor to detect an electric signal, which is obtainable upon basis of reflection lights reflected from the optical disk mounted in advance, including unnecessary lights detected at a disk surface and between said disk surface and a recording surface from the optical disk, while executing a focus sweep operation of gradually approaching the laser beam to a recording surface of the optical disk, at an unnecessary light detection gain set higher than a normal operation gain, thereby counting a number of signals generated due to the unnecessary lights, to be memorized in a memory, and thereafter performs a focus drawn-in process when the optical disk is rotationally driven by the spindle motor to detect the electric signal, which is obtainable upon basis of the reflection lights reflected from the optical disk mounted, and conduct a focus drawing-in, by applying an electric signal, which is generated after a number of signals detected thereof reaches to a counted number of signals generated due to the unnecessary lights, to be a necessary signal reflected from the recording surface of the optical disk.

6. The optical disk apparatus as claimed in claim 5, wherein said pre-process is performed while stopping rotation of the optical disk mounted on the spindle motor.

7. The optical disk apparatus as claimed in claim 5, wherein said pre-process is performed in advance by a manufacturer after manufacture.

8. The optical disk apparatus as claimed in claim 5, wherein the signals generated due to the unnecessary lights are identified based whether an amplitude of the signals is smaller than a maximum amplitude set during the pre-process.

9. An optical disk apparatus, comprising:

an optical pickup including an objective lens and a light source to irradiate a laser beam, via the objective lens;

a spindle motor to load and rotationally drive an optical disk mounted thereon;

a signal generator arranged to generate electric signals based on reflection lights reflected from the optical disk, including unnecessary lights detected at a disk surface and between said disk surface and a recording surface from the optical disk; and a controller arranged to control a focus position of the laser beam on the optical disk to reduce ill influences due to unnecessary lights, wherein the controller is configured to perform a pre-process when the optical disk is mounted on the spindle motor without rotation, so as to obtain false signals due to the unnecessary lights in advance based on the electric signals obtained from the reflection lights reflected from the optical disk, and wherein the controller is further configured to perform a focus drawn-in process when the optical disk is rotationally driven by the spindle motor, so as to detect only necessary signals reflected from the optical disk without false signals due to the unnecessary lights based the electric signals obtained from the reflection lights reflected from the optical disk and the false signals due to the unnecessary lights obtained in advance.

10. The optical disk apparatus as claimed in claim 9, wherein the controller obtains the false signals due to the unnecessary lights during the pre-process by executing a focus sweep operation of gradually approaching the laser beam to a recording surface of the optical disk, at an unnecessary light detection gain set higher than a normal operation gain.

11. The optical disk apparatus as claimed in claim 10, wherein the controller further stores a number of false signals generated due to the unnecessary lights in a memory for use during the focus drawn-in process.

12. The optical disk apparatus as claimed in claim 9, wherein the controller detects only the necessary signals reflected from the optical disk without false signals due to the unnecessary lights during the focus drawn-in process by executing a focus sweep operation of gradually approaching the laser beam to a recording surface of the optical disk, at an unnecessary light detection gain set higher than a normal operation gain, and then conducting a focus drawing-in for focusing the laser beam on the recording surface of the optical disk.

* * * * *